(12) United States Patent
McCann et al.

(10) Patent No.: US 10,318,843 B2
(45) Date of Patent: Jun. 11, 2019

(54) METHOD AND APPARATUS FOR IMAGE PROCESSING AND COMPARISON BASED ON SPATIAL RELATIONSHIPS BETWEEN IMAGE FEATURES

(71) Applicant: Rakuten Kobo, Inc., Toronto (CA)

(72) Inventors: Sancho Juan Carlos Dean Rob Roy McCann, Vancouver (CA); Marius Constantin Muja, North Vancouver (CA); Peter Michael Bruce Hudson, Vancouver (CA)

(73) Assignee: Rakuten Kobo, Inc., Toronto (CA)

( * ) Notice: Subject to any disclaimer, the term of this patent is extended or adjusted under 35 U.S.C. 154(b) by 125 days.

(21) Appl. No.: 15/474,128

(22) Filed: Mar. 30, 2017

(65) Prior Publication Data
US 2017/0286804 A1    Oct. 5, 2017

Related U.S. Application Data

(60) Provisional application No. 62/315,408, filed on Mar. 30, 2016.

(51) Int. Cl.
*G06K 9/00* (2006.01)
*G06K 9/62* (2006.01)
(Continued)

(52) U.S. Cl.
CPC .......... *G06K 9/6215* (2013.01); *G06F 16/22* (2019.01); *G06K 9/00201* (2013.01); *G06T 7/73* (2017.01); *G06T 2207/10016* (2013.01)

(58) Field of Classification Search
CPC .... G06K 9/6215; G06K 9/00201; G06T 7/73; G06F 12/30312
See application file for complete search history.

(56) References Cited

U.S. PATENT DOCUMENTS 8,473,481 B2 *   6/2013   Williams .............. G06Q 10/06
                                                        707/711
9,104,701 B1 *   8/2015   Phung .............. G06F 17/30256
(Continued)

OTHER PUBLICATIONS

Majerowicz, Lucas, Shamir, Ariel, Sheffer, Aller, Hoos,Holger, "Filling Your Shelves: Synthesizing Diverse Style-Preserving Artifact Arrangements" IEEE Transactions on Visualization on Computer Graphics (Year: 2014).*

*Primary Examiner* — Edward Park
*Assistant Examiner* — Molly Delaney
(74) *Attorney, Agent, or Firm* — Oblon, McClelland, Maier & Neustadt, L.L.P.

(57) ABSTRACT

An apparatus that includes a computer server having processing circuitry operatively coupled to a memory and a communication interface is provided. A remote image capture device is communicatively coupled to the computer server via the communication interface. The apparatus acquires a captured image of a storage system from the image capture device. The apparatus identifies a pair of physical items in the image, including determining identities of each item of the pair of physical items, and identifying locations in the storage system of each physical item of the pair of physical items. The apparatus processes the image to measure a physical proximity between the pair of physical items, and generates or updates a measure of similarity between the pair of physical items based on the measured physical proximity. The apparatus can also process multiple images to determine similarity between different storage systems or associated persons based on item proximities.

23 Claims, 7 Drawing Sheets

(51) Int. Cl.
*G06T 7/73* (2017.01)
*G06F 16/22* (2019.01)

(56) References Cited

U.S. PATENT DOCUMENTS

| | | | |
|---|---|---|---|
| 9,904,866 B1* | 2/2018 | Noble | G06K 9/3241 |
| 2008/0243816 A1* | 10/2008 | Chan | G06F 17/30867 |
| 2014/0092241 A1* | 4/2014 | Brinkman | G06K 9/00671 |
| | | | 348/135 |
| 2015/0325004 A1* | 11/2015 | Utsunomiya | A61B 5/742 |
| | | | 382/103 |
| 2016/0092854 A1* | 3/2016 | Wu | G06Q 20/123 |
| | | | 705/26.81 |
| 2016/0117329 A1* | 4/2016 | Busey | G06F 17/3053 |
| | | | 707/726 |
| 2016/0253562 A1* | 9/2016 | Yuki | G06T 7/73 |
| | | | 382/153 |
| 2018/0005035 A1* | 1/2018 | Bogolea | B25J 9/1664 |

* cited by examiner

Proximity relations for shelf i $p_{SHELF\_i}(a, b, 1) = 1$
$p_{SHELF\_i}(b, c, 1) = 1$
$p_{SHELF\_i}(c, d, 1) = 1$
$p_{SHELF\_i}(a, b, 2) = 1$
$p_{SHELF\_i}(a, c, 2) = 1$
$p_{SHELF\_i}(b, c, 2) = 1$
$p_{SHELF\_i}(b, d, 2) = 1$
$p_{SHELF\_i}(c, d, 2) = 1$
$p_{SHELF\_i}(a, b, 3) = 1$
$p_{SHELF\_i}(a, c, 3) = 1$
$p_{SHELF\_i}(b, c, 3) = 1$
$p_{SHELF\_i}(b, d, 3) = 1$
$p_{SHELF\_i}(c, d, 3) = 1$
$p_{SHELF\_i}(a, d, 3) = 1$
...

METHOD AND APPARATUS FOR IMAGE PROCESSING AND COMPARISON BASED ON SPATIAL RELATIONSHIPS BETWEEN IMAGE FEATURES

CROSS-REFERENCE TO RELATED APPLICATIONS

This application claims priority from U.S. Provisional Patent Application No. 62/315,408 filed on Mar. 30, 2016, and which is herein incorporated by reference.

FIELD

The present disclosure pertains to the fields of image analysis, artificial intelligence, image processing and data processing. In particular, this disclosure relates to a method and system for acquiring and automatically processing images containing a class of items, and generating information characterizing the images and/or items based on parameters inherent to the images.

BACKGROUND

Presenting a user with recommendations for their next interaction based on their previous interactions is a common-place tactic. Examples include lists of previously viewed and rated movies on NETFLIX®, previously searched for, browsed, or bought items on AMAZON®, and previously viewed YOUTUBE® videos. Ciancutti, John et al. (2014), "Recommending groups of items based on item ranks," U.S. Pat. No. 8,903,834; Jacobi, Jennifer et al. (2006), "Personalized recommendations of items represented within a database," U.S. Pat. No. 7,113,917; and Wei, Li et al. (2017), "Video Recommendation Based on Video Co-Occurrence Statistics," U.S. patent application Ser. No. 15/276,605.

This background information is provided to reveal information believed by the applicant to be of possible relevance to the present invention. No admission is necessarily intended, nor should be construed, that any of the preceding information constitutes prior art against the present invention.

SUMMARY

Existing recommendation systems have a limited view into a user's preferences. Any method that gives more information to a recommendation system is a potential, but not certain, improvement.

One problem with existing systems is that they do not take into account real-world curation information (how people organize their things in their physical spaces) and they lack comprehensive information about a person's real-world collection.

Therefore, there is a need for a method and system for automatic discernment of inherent curation information and/or associated item recommendation that is not subject to one or more limitations of the prior art.

Aspects of the present invention provide a method and apparatus for processing and comparing images of item collections. Photographic images are captured by remote devices and parsed to identify items therein belonging to a recognizable class. The identified items are further processed by an automated image processing system to determine their particular identities within the class. Optical pattern recognition and optical character recognition can be employed. The images are further processed by the system to measure spatial relationships between pairs or sets of the identified items. Measures of similarity between different images and/or between items appearing pairwise in multiple images are then generated and updated by the system based on the measured spatial relationships. The similarity metrics can be stored in a database and used to support similarity-based item or image queries. The similarity metrics and data handling procedures are configured to provide for computational efficiency by the automated image processing system.

Aspects of the present disclosure provide for a method and apparatus for image processing and comparison (of images and/or items recognized therein) based on spatial relationships between common image features. Embodiment methods and systems acquire and automatically process images of item collections, and generate information characterizing (e.g. indicating similarity between) the images and/or items therein based on parameters inherent to the images. The parameters can include relative spatial relationships between pairs of features (e.g. recognizable objects) common to plural images. This can be implemented to support additional item recommendations based on physical proximity data. User-personalized browsing guidance and recommendations can be provided based on that user's collection of physical items and the associations between that user's collection and the collections of other users in a community.

In accordance with embodiments of the present disclosure, there is provided an apparatus comprising circuitry configured to: acquire a captured image of a storage system via, a network from a remote image capture device; identify a pair of physical items in the image, including determining identities of each item of the pair of physical items, and identifying locations in the storage system of each physical item of the pair of physical items; process the image to measure a physical proximity between the pair of physical items; and generate or update a measure of similarity between the pair of physical items based on the measured physical proximity.

In accordance with other embodiments of the present disclosure, there is provided an apparatus for automatically measuring similarities between physical items, the apparatus comprising a computer server having a processing circuitry operatively coupled to memory, the computer server communicatively coupled to a remote image capture device, the apparatus configured to: capture an image of a storage system using the remote image capture device; identify, using the remote image capture device, the computer server, or a combination thereof, a pair of physical items in the image, including determining identities of each item of the pair of physical items, and identifying locations in the storage system of each physical item of the pair of physical items; process, using the remote image capture device, the computer server, or the combination thereof, the image to measure a physical proximity between the pair of physical items; and generate or update, by the remote image capture device, the computer server, or the combination thereof, a measure of similarity between the pair of physical items based on the measured physical proximity.

In various embodiments, the physical items are books, the storage system is a bookshelf, and the identities comprise book titles and/or contents. In various embodiments the apparatus is further configured to recommend (and corresponding methods comprise recommending), e.g. using a user interface on the remote image capture device, the computer server, or the combination thereof, books to a user based on the measure of similarity.

In accordance with other embodiments of the present disclosure, there is provided an apparatus for measuring similarities between storage systems (e.g. bookshelves) or persons associated therewith, the apparatus comprising circuitry configured to: direct capturing of images of (at least) two storage systems using the one or more remote image capture devices; receive the images of the two storage systems; for each one of the images: identify one or more pairs of physical items (e.g. books) in the image, including determining identities (e.g. titles) of each physical item of each of the pairs of physical items, and identifying locations in the storage system of each item of each of the pairs of physical items; process the image to measure physical proximities between items of each of the pairs of physical items; and generate or update a measure of similarity between the storage systems or persons associated therewith, based on the physical proximities. The apparatus may include a computer server having a processor operatively coupled to memory and communicatively coupled to one or more image capture devices via a communication network.

In accordance with other embodiments of the present disclosure, there is provided a method for automatically measuring similarities between physical items comprising: acquiring an image of a storage system via a network from a remote image capture device; identifying, using processing circuitry, a pair of physical items in the image, including determining identities of each item of the pair of physical items, and identifying locations in the storage system of each physical item of the pair of physical items; processing, using the processing circuitry, the image to measure a physical proximity between the pair of physical items; and generating or updating, using the processing circuitry, a measure of similarity between the pair of physical items based on the measured physical proximity.

In accordance with other embodiments of the present disclosure, there is provided a method for automatically measuring similarities between physical items comprising: capturing an image of a storage system using a remote image capture device; identifying, by the remote image capture device, a computer server, or a combination thereof, the computer server communicatively coupled to the remote image capture device and in receipt of the image, a pair of physical items in the image, including determining identities of each item of the pair of physical items, and identifying locations in the storage system of each physical item of the pair of physical items; processing, by the remote image capture device, the computer server, or the combination thereof, the image to measure a physical proximity between the pair of physical items; and generating or updating, by the remote image capture device, the computer server, or the combination thereof, a measure of similarity between the pair of physical items based on the measured physical proximity.

In accordance with other embodiments of the present disclosure, there is provided a method for measuring similarities between storage systems or persons associated therewith, comprising: acquiring images of (at least) two storage systems via a network from one or more remote image capture devices; and for each one of the images: identifying one or more pairs of physical items in the image, including determining identities of each item of each of the pairs of physical items, and identifying locations in the storage system of each item of each of the pairs of physical items; processing the image to measure physical proximities between physical items of each of the pairs of physical items; and generating or updating a measure of similarity between the storage systems or persons associated therewith, based on the physical proximities. The method can be carried out using processing circuitry, for example of a computer server having at least a processor, memory, and a network interface.

In accordance with other embodiments of the present disclosure, there is provided a method for measuring similarities between books comprising: capturing images of a set of bookshelves using a camera device; processing the images to identify books on said bookshelves; processing the images to determine proximities between pairs of books on said bookshelves; and measuring similarities between pairs of books based on said determined proximities.

In accordance with other embodiments of the present disclosure, there is provided a method for measuring similarities between bookshelves comprising: capturing images of a set of bookshelves; processing the images to identify books on said bookshelves; processing the images to determine proximities between pairs of books on said bookshelves; and measuring similarities between bookshelves based on said determined proximities.

In accordance with other embodiments of the present disclosure, there is provided a method for measuring similarities between users comprising: capturing images of a set of bookshelves; processing the images to identify books on said bookshelves; processing the images to determine proximities between pairs of books on said bookshelves; and measuring similarities between users based on said determined proximities.

In accordance with other embodiments of the present disclosure, there is provided an apparatus for measuring similarities between books, the apparatus comprising a computer server having processing circuitry such as a microprocessor operatively coupled to memory and a set of smartphones having cameras or other remote image capture devices, the apparatus configured to: capture images of a set of bookshelves using the cameras; process the images to identify books on said bookshelves using the computer server; process the images to determine proximities between pairs of books on said bookshelves using the computer server; and measure similarities between pairs of books based on said determined proximities using the computer server.

In accordance with other embodiments of the present disclosure, there is provided an apparatus for measuring similarities between bookshelves, the apparatus comprising a computer server having processing circuitry such as a microprocessor operatively coupled to memory and a set of smartphones having cameras or other remote image capture devices, the apparatus configured to: capture images of a set of bookshelves using the cameras; process the images to identify books on said bookshelves using the computer server; process the images to determine proximities between pairs of books on said bookshelves using the computer server; and measure similarities between bookshelves based on said determined proximities using the computer server.

In accordance with other embodiments of the present disclosure, there is provided an apparatus for measuring similarities between users, the apparatus comprising a computer server having processing circuitry such as a microprocessor operatively coupled to memory and a set of smartphones having cameras or other remote image capture devices, the apparatus configured to: capture images of a set of bookshelves using the cameras; process the images to identify books on said bookshelves using the computer server; process the images to determine proximities between pairs of books on said bookshelves using the computer server; and measure similarities between users based on said determined proximities using the computer server.

Embodiments of the present disclosure provide for a method and apparatus for providing indications of similarities between physical items, storage systems, and/or persons associated therewith, wherein the similarities are generated by observations of storage systems and are reflective of proximities between items which are held in the storage systems.

BRIEF DESCRIPTION OF THE FIGURES

Further features and advantages will become apparent from the following detailed description, taken in combination with the appended drawing, in which.

It will be noted that throughout the appended drawings, like features are identified by like reference numerals.

DETAILED DESCRIPTION

Previous disclosures that use the physical contents of a shelf or other repository to inform recommendations do not suggest or teach how to use information about the physical proximity between items as a signal for the recommendation system. Williams, Oliver M. C. and Michael A. Isard (2009), "Object recognition and library," U.S. Pat. No. 8,473,481.

Embodiments of the present disclosure do not necessarily require users to manually categorize the items on their shelves any more than they may have already done. While some users may have not put much thought into the manner in which they shelve their items, at scale, it is anticipated that enough users may have grouped items in meaningful ways such that information can be extracted from those physical patterns and such information used to produce relevant recommendations.

Embodiments of the present disclosure provide for a system that captures an image of a storage system and records the identities and relative locations of the various items of interest that are stored within. An example of a storage system is a bookshelf, and examples of items of interest are books. However, other physical items of interest, or a mixture of items of interest, can be captured and processed. Examples of such items include media carriers such as CDs or DVDs, collectible items, tools, food items or beverages such as liquor bottles, or the like. Storage systems can include shelves, contents of drawers, or other physical spaces in which items can be stored and spatially organized.

Embodiments of the present disclosure provide for a method and apparatus for using the physical proximity of items in a physical storage system as input to a recommendation system. The layout that a user has chosen for the items in their physical storage system is taken as an indication of an underlying relationship between these items that may not be readily apparent in a flat inventory. This is particularly evident in the shelving of books. Users often choose some systematic method of shelving their books so that nearby books are related in some sense that is meaningful for the user. Users might shelve their books randomly, alphabetically, or grouped by author, subject, owner (in multi-person households), or one of many other latent categories. The present disclosure uses the physical proximity of items as an indicator of similarity of those items. Moreover, physical proximity of multiple instances of items, as observed in different multiple storage systems, can be used as an aggregate indicator of similarity of those items.

Embodiments of the present disclosure provide for a method and apparatus for mapping from a user to other users with similar physical relationships between their items. A user can be a person associated with a bookshelf, such as the owner or curator of the bookshelf and/or its contents. A user that has shelved books A and B adjacent to each other will be considered more similar to a second user that has also shelved books A and B adjacent to each other than to a third user that has books A and B, but not shelved adjacent to each other. This aspect of the present disclosure includes the use of spatial relationships other than direct adjacency. For example, embodiments of the present disclosure may use the signal that books A and B are shelved within K books of each other, where K is an integer. Other measures of distance, for example straight-line distance, can also be used.

It should be noted, for clarity, that when a physical item (e.g. a book) is described herein as being located on two different storage systems (e.g. bookshelves), this does not necessarily mean that the exact same physical item is located in two different storage systems. Rather, the physical items in the two different storage systems can refer to two different instances of the same type of physical item. For example, "book A" on one bookshelf can be a first copy of a given book, while "book A" on another bookshelf can be a second copy of the same given book. The two copies can possibly be different editions, have different covers, etc. However, the system as described herein recognizes them as different copies of the same general class of books, and treats them accordingly. That is, the convention is used that a "book" refers to any separate instance of the same titled book, i.e. two copies of the same titled book are referred to as the same book even though they are actually copies.

Embodiments of the present disclosure provide for a method and apparatus for mapping from items, such as books, to other items. In particular, pairs of items or groups of three or more items are marked as being more similar the more frequently they are shelved closely together on the shelves of users. For example, embodiments of the present disclosure may use a rule that if books A and B are shelved adjacent to each other on 1 percent of bookshelves, they will be considered more similar to each other than books A and C if books A and C are shelved adjacent to each other in only 0.5 percent of bookshelves. This aspect of the present disclosure may aggregate together several measures of physical proximity into the total similarity score. For example, in one embodiment, the method counts how many bookshelves include books A and B directly adjacent to each other, how many bookshelves include books A and B separated by 1 book, how many bookshelves include books A and B separated by 2 books, and so on. These counts may be weighted such that the counts of bookshelves in which books A and B are separated by fewer books would confer greater similarity.

Embodiments of the present disclosure comprise obtaining and processing a substantial number of images of different storage systems to obtain a substantial sample of item instances and measures of physical proximities between item instances in each storage system. Similarities between physical items can be discerned with a clarity and confidence that generally increases with the sample size.

Embodiments of the present disclosure provide for an apparatus for automatically measuring similarities between physical items, such as books. Having reference to FIG. 1, the apparatus includes a computer server 140 having a processing circuitry such as processor 142 operatively coupled to memory 144 and a communication interface 146. The computer server 140 is communicatively coupled to a remote image capture device 120 via the communication interface. The image capture device can be a mobile device such as a smartphone or other device having a camera 122. The image capture device can further include a communication interface 124 and a user interface 126. The computer server 110 may further be coupled to a database 145. A separate user interface device 130 can also be provided in some embodiments.

Figure 1:
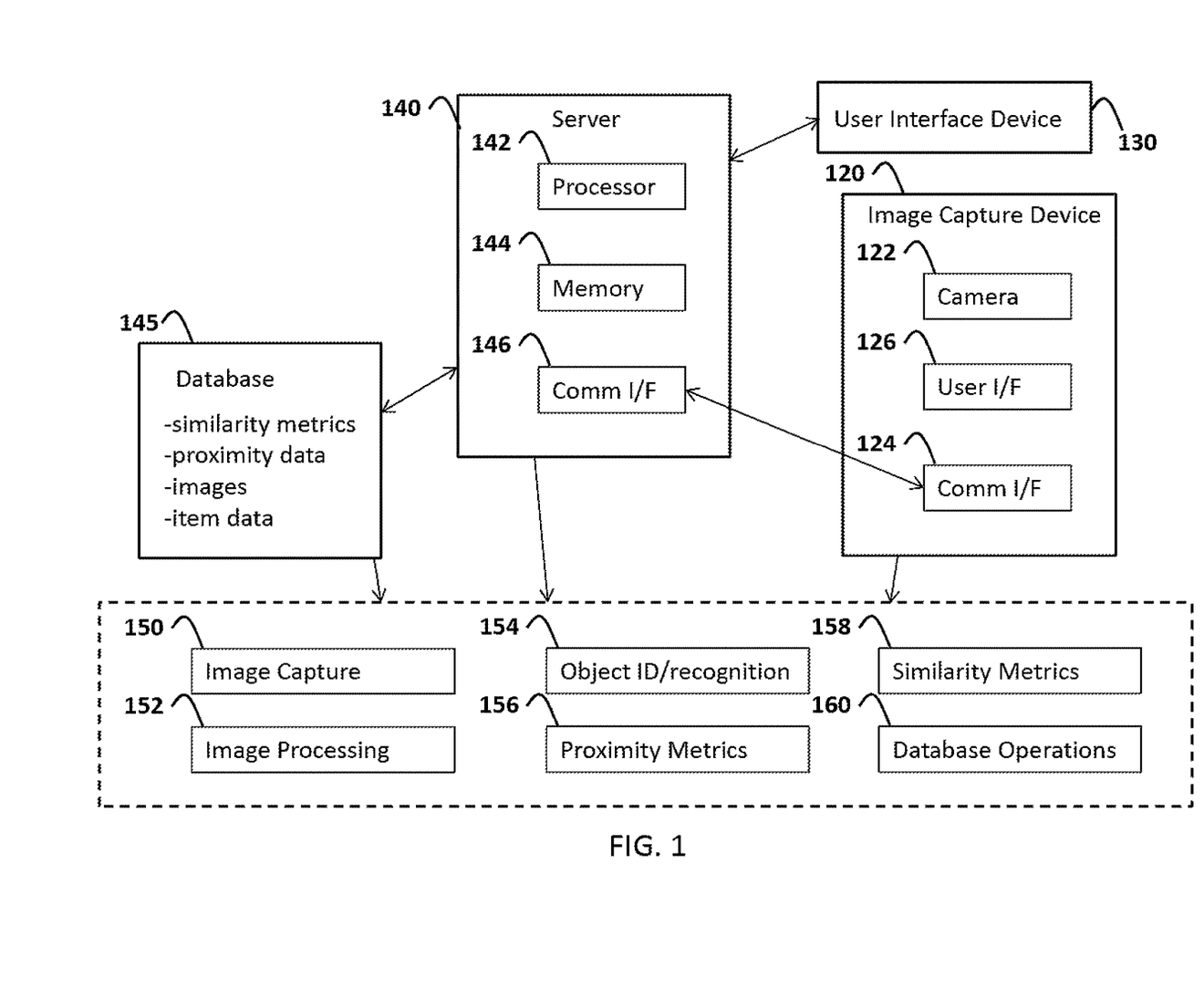
FIG. 1 illustrates an apparatus for automatically measuring similarities between physical items, in accordance with an embodiment of the present disclosure.

The apparatus is configured to perform a variety of interrelated functions (and/or support related functional modules), for example via configuration of the computer server 140 in cooperation with the database 145, and further in cooperation with the image capture device 120. These functions or modules include image capture 150, image processing 152, object identification/recognition 154, measurement of pairwise object proximity 156, generating and updating similarity metrics 158, and database storage and query response 160. The apparatus is configured to provide sufficient computing power to complete these tasks for a desired volume and rate of incoming image data and queries. For example, the server and database may correspond to a scalable collection of servers and databases, respectively. Furthermore, the operations of the apparatus and the configuration of the similarity metrics themselves can provide for efficient operation of the apparatus, for example to store data in an efficient form, limit computational complexity, and readily respond to queries.

Figure 2:
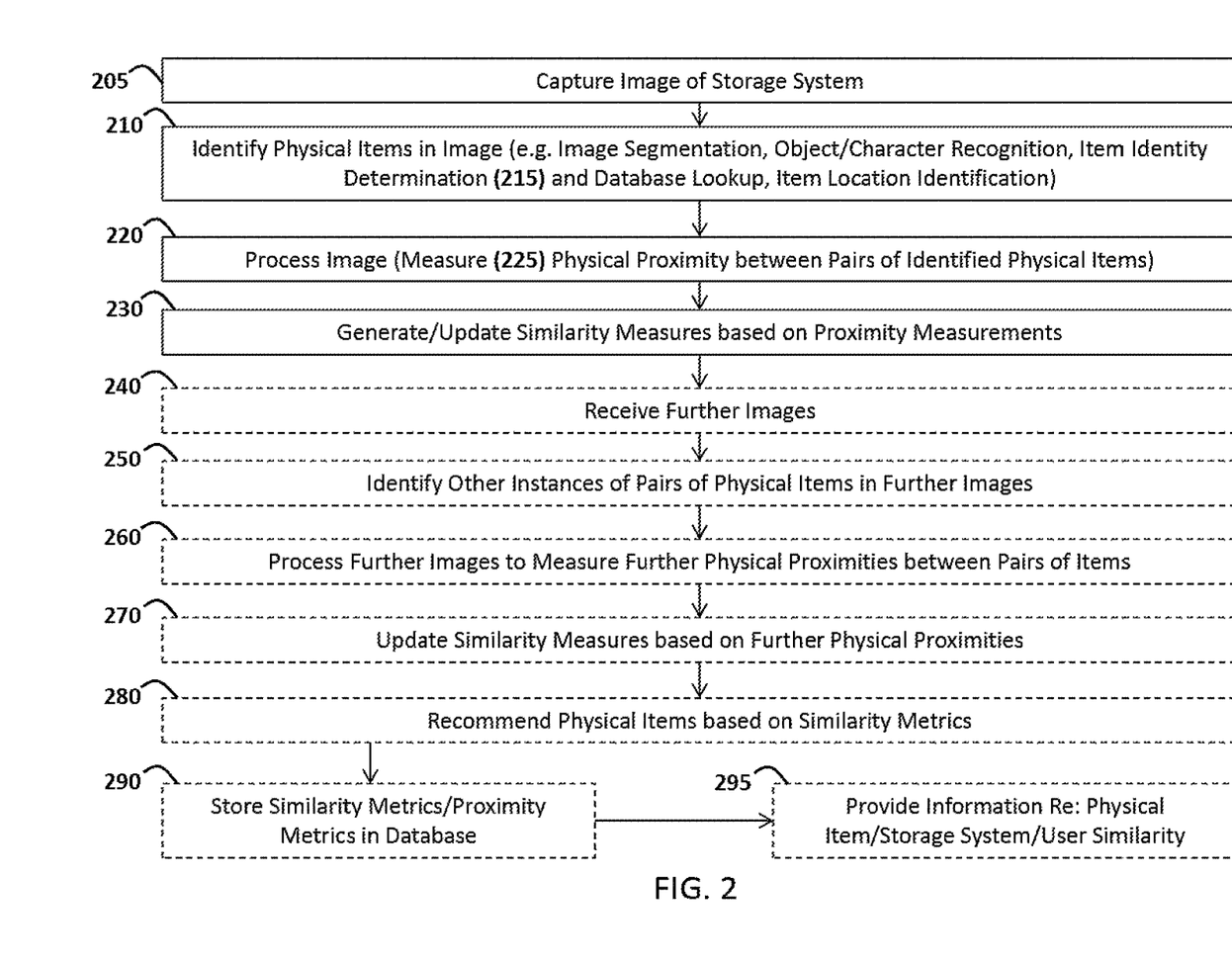
FIG. 2 illustrates a method for measuring similarities between physical items, according to an embodiment of the present disclosure.

Referring to FIG. 2, an embodiment of the present disclosure comprises capturing 205 an image of a storage system, such as a bookshelf, using the remote image capture device. The remote image capture device 120 may transmit the image to the server 110 via the respective communication interfaces 116, 124. The image can be captured using an application operating on the device 120 which instructs a user how to adequately capture the image. The embodiment further comprises identifying 210 a collection of physical items in the image, processing image information corresponding to the collection of identified physical items 220, and generating or updating 230 measures of similarity between the identified physical items. Generating or updating the measures of similarity is performed for pairs of physical items based on the measured physical proximities thereof. These operations can be performed by the computer server 140, or by an adequately powerful and connected image capture device 120, or a combination thereof. Identifying the physical items includes determining 215 identities of the items (e.g. book titles) and identifying their physical locations in the storage system of the items. Processing the image information corresponding to the collection of identified physical items includes measuring 225 a physical proximity between pairs of the identified items. As used herein, processing image information (e.g. image information corresponding to a collection of physical items) is regarded to be an image processing operation. Image processing includes performing operations on image data to derive further data which characterizes the image.

In some embodiments, the above embodiment comprises receiving 240, from the remote image capture device or another remote image capture device, further images of further respective storage systems. Other instances of pairs of physical items in each of the further images are then identified 250. These other instances can be other instances of pairs of physical items already identified e.g. in step 210. This includes determining the identities of physical items, and identifying locations, in each of the further storage systems, of the physical items. The present embodiment further comprises processing 260 image information corresponding to each of the collections of identified physical items from the further images. This processing includes measuring respective further physical proximities between the instance of the pair of physical items as occurring in each of the further storage systems. The present embodiment further comprises updating 270 the measure of similarity between the pair of physical items based on the determined further physical proximities.

The present embodiment may further comprise recommending 280, using a user interface 126 of the remote image capture device or other user interface device 130, the computer server, or a combination thereof, other physical items (e.g. books) to a user based on the measure of similarity. For example, when a user has indicated interest in (e.g. possession of) one item (e.g. book), recommending items to the user can include recommending another item with a probability or recommendation strength which increases with the determined measure of similarity between the items. Multiple items can be recommended, for example those items exceeding a predetermined similarity score may be presented, or the items with the highest N similarity scores may be presented, where N is a predetermined number, or all items can be ranked in order of decreasing similarity score and the ranked list made available.

It is noted that the measure of similarity between a given pair of physical items may, in various embodiments, be a nondecreasing function of a number of observed images of storage systems in which instances of the pair of physical items are identified. That is, similarity may increase or stay constant as the number of observed images including the pair of physical items increases, but does not decrease as the number of observed images including the pair of physical items increases.

The measure of similarity between a pair of physical items may, in various embodiments, be a nondecreasing function of the measured physical proximity of instances of the pair of physical items in observed images of storage systems (in which such instances of the pair of physical items are identified). That is, when an image including the pair of items is taken into account, the contribution from that image to the measured similarity between the pair of items is greater, or at least not smaller, as proximity between the pair of items in that image increases.

In some embodiments, the above-described embodiment further comprises storing 290, in the database 145, one or both of the measure of similarity and the measure of proximity, and providing 295, based on data stored in the database, information indicative of one or more of: similarities between physical items, similarities between storage systems, and similarities between persons associated with storage systems.

Embodiments of the present disclosure provide for measuring similarities between storage systems (e.g. bookshelves) or persons associated therewith. The apparatus again includes a computer server 140 having processing circuitry such as a processor operatively coupled to memory and a communication interface, the computer server being communicatively coupled to one or more remote image capture device 120 via the communication interface. The database 145 may also be included. Having reference to FIG. 3, the present embodiment comprises directing 310 capturing of images of two storage systems using the one or more remote image capture devices. The present embodiment further comprises receiving 320 the images of the two storage systems at the computer server 140. The present embodiment further comprises, for each one of the images, identifying 330, e.g. by the computer server, one or more pairs of items in the image. This includes identifying identities of the items (e.g. book titles) of each item of each of the pairs of items, and identifying locations in the storage system of each item of each of the pairs of items. The present embodiment further comprises, for each one of the images, processing 340 image information corresponding to the collection of identified items, e.g. by the computer server, to measure physical proximities between items of each of the pairs of items. The present embodiment further comprises, for each one of the images, generating or updating 350, e.g. by the computer server 140, a measure of similarity between the storage systems or persons associated therewith, based on the physical proximities.

Figure 3:
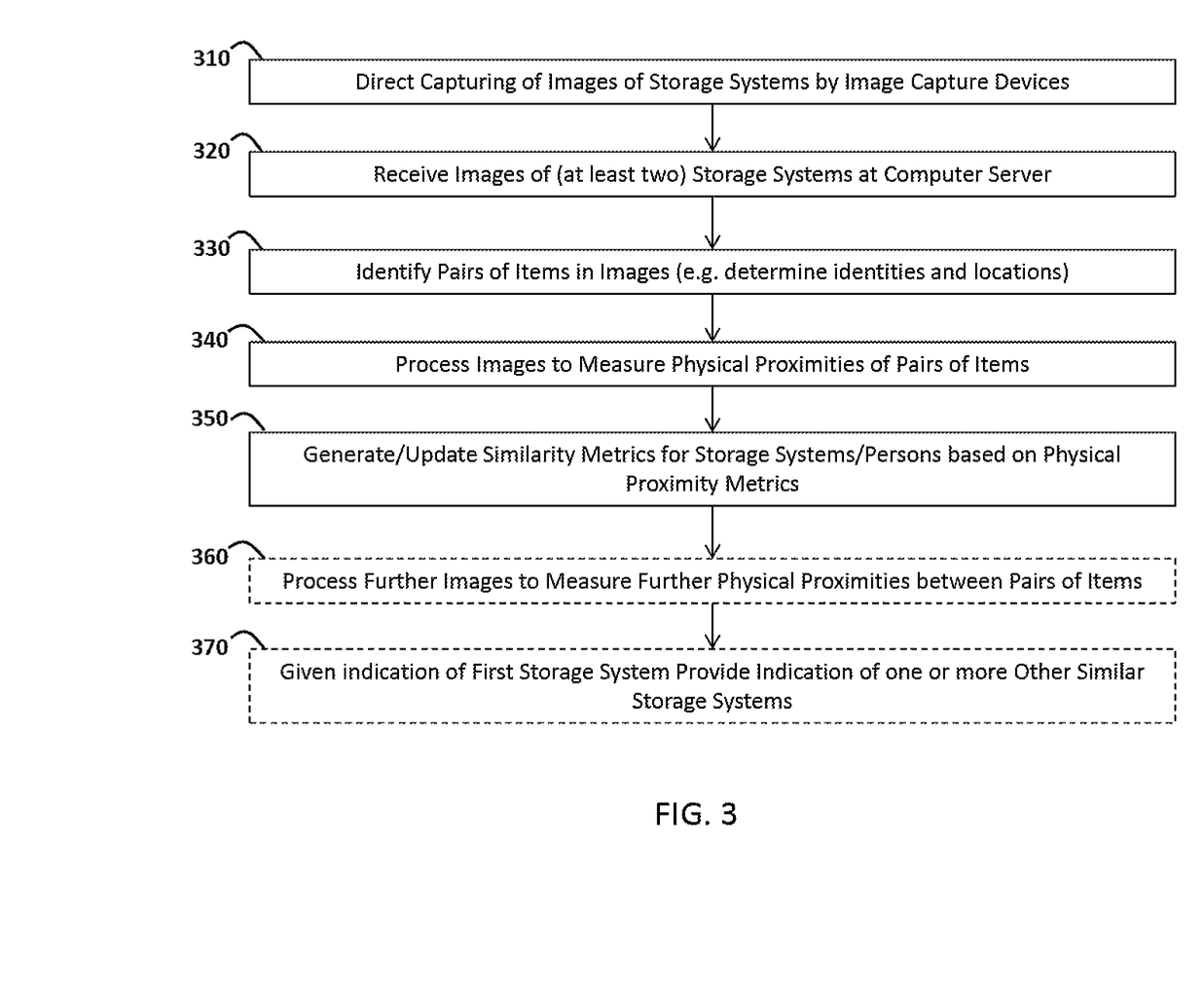
FIG. 3 illustrates a method for measuring similarities between storage systems or associated persons, according to an embodiment of the present disclosure.

The above-described embodiment may further comprise storing 360, in the database 145: indications of a plurality of storage systems or persons associated therewith; and measures of similarities between pairs of the plurality of storage systems or persons associated therewith. The present embodiment may then further comprise, upon receiving an indication of a first one of the plurality of storage systems or persons associated therewith, providing 370 an indication of another of the plurality of storage systems or persons associated therewith having a relatively high measured similarity to said first one of the plurality of storage systems or persons associated therewith.

In various embodiments, the measure of similarity (between storage systems or persons associated therewith) is a nondecreasing function of a number of instances of pairs of items which occur on both of the two storage systems. That is, the measure of similarity increases or stays constant with the count of pairs of items which occur in both of the two storage systems, or equivalently with the count of items which occur in both of the two storage systems.

In various embodiments, the measure of similarity (between storage systems or persons associated therewith) is a nondecreasing function of similarity (e.g. equality or inverse of numerical difference) between the measured physical proximities between instances of pairs of items which occur in both of the two storage systems. That is, when the physical proximity between two instances of the item in one storage system is $p_1$, and the physical proximity between the two instances of the same item in the other storage system is $p_2$, the similarity between the physical proximities is roughly $|p_1-p_2|$ (or a nondecreasing function thereof). Then, the measure of similarity between storage systems or persons is a nondecreasing function of this similarity. This may be true separately for each pair of items found in both storage systems.

A particular example embodiment of the present disclosure will now be described. It should be understood that the details of this example are not intended to be limiting to the present disclosure. In the example embodiment, users are presented with an interface on a remote image capture device (e.g. smartphone or other mobile device or electronic user device) that guides them to capture a suitably well-framed image (or collection of images) of a portion or portions of their bookshelf.

This image is segmented into potential book spines using a book segmentation algorithm such as that set forth in Talker, Lior (2013), "Book spine segmentation for bookshelf reorganization," M.Sc. Thesis. The individual spines are identified by using a combination of visual feature matching against a database of previously identified spines, and optical character recognition. As an example, this task may be accomplished by the method and system of Hudson, Peter et al. (2015), "Method and system for identifying books on a bookshelf," U.S. patent application Ser. No. 14/745,066. This results in an indication of a collection of identified items (e.g. books) and their locations in the associated image.

In the present embodiment, similarity is measured based on proximity relationships between books that are separated by fewer than K books. In the following, a collection of books $\mathbb{B}$, shelves $\mathbb{S}$, and users $\mathbb{U}$ are assumed. Books that are separated by a smaller distance, e.g. separated by a fewer number of books, are deemed to be more proximate, and ultimately more similar. Similarity is therefore an increasing, or at least nondecreasing, function of proximity.

For each shelf $s_i \in \mathbb{S}$, a proximity relationship $p_{s_i}(a, b, k)$ is stored for each pair of books $(a, b) \in \mathbb{B}^2$ and for $k \in (1 \ldots K)$.

The proximity relationship between a pair of books may be established by setting $p_{s_i}(a, b, k)=1$ if books a and b are in shelf $s_i$ and separated by fewer than k books. $p_{s_i}(a, b, k)=0$ otherwise. It should be appreciated that alternative definitions of $p_{s_i}$ may be provided, for example in which $p_{s_i}$ decreases from a maximum value to a minimum value more gradually with separation distance.

In some embodiments, when the above binary-valued definition of $p_{s_i}$ is used, rather than storing $p_{s_i}(a, b, k)$ for each value of k between 1 and K, a threshold value of k, such as the lowest non-zero value of k, can be stored. This value is approximately proportional to the distance between a and b, from which the $p_{s_i}$ values can be recovered. The choice of representation may be based on computation and memory usage considerations.

If we are interested in proximity relationships between books separated by fewer than K books, the number of proximity relationships on a shelf with M books is given by:

$$\sum_{j=1}^{K} \sum_{i=1}^{j} (M-i) = \frac{M-1}{2}K^2 + \frac{3M-2}{6}K - \frac{1}{6}K^3$$

If it is assumed, for example, that the average shelf image contains 12 books (in an experimental dataset, this was observed to be approximately correct), and K=5 is set, the above equation gives 145 proximity relationships observed on the average shelf.

The proximity relations for a user's entire collection of shelf images is taken to be the union of the proximity relations of his or her individual shelves.

A global proximity count can also be tracked for each pair of titles. Define $p_{all}(a, b, k)$ to be the count of the number of users for which $p_u(a, b, k)=1$. ($p_u(a, b, k)$ can be defined similarly to $p_{s_i}(a, b, k)$, but corresponding to users instead of shelves. Also, the count $p_{all}$ may alternatively be a count over observations of shelves rather than users.) That is:

$$p_{all}(a, b, k) = \sum_{u \in U} p_u(a, b, k)$$

While there may be approximately $3 \times 10^{10}$ possible proximity relationships (assuming 350,000 titles in the dataset, and setting K=5), many fewer relationships are actually observed. As mentioned above, in the average shelf image, there are approximately 145 proximity observations when setting K=5. This puts an upper bound on the number of non-zero entries in pall. For example, if the dataset includes 1 million shelf images, an upper bound on the number of non-zero entries in $p_{all}$ is $1.5 \times 10^8$. This is a relatively weak upper bound as it does not account for the fact that many proximity relationships will be observed on more than one shelf. That is, many proximity relationships on a newly observed shelf will have already been seen and not result in a new entry in $p_{all}$.

Examples of similarity computations will now be described, which should be understood to be non-limiting. The similarity between two shelves $s_i$ and $s_j$ is given by:

$$sim(s_i, s_j) = \sum_{k=1}^{K} \sum_{a \in B} \sum_{b \in B} \min(p_{s_i}(a, b, k), p_{s_j}(a, b, k)) \cdot \omega_k$$

This is the intersection of the proximity relationships found in each of the shelves. $\omega_k$ are weighting factors that give more emphasis to proximity relationships with lower k. (E.g. $\omega_k$ generally increases as k decreases.)

A similar equation may be used to define the similarity between users $u_i$ and $u_j$:

$$sim(u_i, u_j) = \sum_{k=1}^{K} \sum_{a \in B} \sum_{b \in B} \min(p_{u_i}(a, b, k), p_{u_j}(a, b, k)) \cdot \omega_k$$

Interchanging the order of summation in the above so that the summation over k occurs last, and noting that the individual terms of the summation are equal to $\omega_k$ if both $u_i$ and $u_j$ have books a and b shelved within k of each other (and zero otherwise), it can be seen that the measure of similarity between users, is equal to a weighted sum over pairs of items appearing on shelves of both users, where each term in the weighted sum has a numerical value which is nondecreasing with the physical proximity between the pair of items on the shelves of the users. Similarity measures between shelves can similarly be generated (e.g. by assigning each shelf to a nominal "user" in a one-to-one correspondence.)

The similarity between two books a and b uses the global proximity counts in $p_{all}$ and is given by:

$$sim(a, b) = \sum_{k=1}^{K} p_{all}(a, b, k) \cdot \delta_k$$

where $\delta_k$ are weighting factors comparable to the weighting factors $\omega_k$, but may have different values than $\omega_k$. Substituting the previously mentioned equation for $p_{all}$ into the above and changing the order of summation, it can be seen that the measure of similarity between books is a weighted sum that is reflective of past and current observations of storage systems holding the pair of physical items, that each term in the weighted sum has a numerical value which increases with the measured physical proximity in a corresponding observation.

Each of the above similarity metrics can be modified so that the effect of rare relationships is magnified compared to the effect of frequent relationships. For example, the fact that two sequential books in the same series (e.g. the Harry Potter series) are often found next to each other, makes that proximity relationship less informative from a book discovery perspective. A term frequency-inverse document frequency (TF-IDF) weighting may be used for each proximity relationship. Such a weighting may endow rarely-occurring relationships with more effect in the similarity measures.

In some embodiments, because the proximity relations are expected to be sparse, they may be stored in a hash map that is indexed by a triple (a, b, k) and maps to a list of shelf or user IDs such that the proximity relationship is present in those shelves or for those users:

$$h(a,b,k)=\{i: \mathbb{S}(a,b,k)=1\}$$

The following method efficiently finds the nearest neighbors of a query shelf $s_i$.

---
Method 1: SimilarShelves($s_i$)

---
Data: hashmap h(a, b, k) → {j : $p_{s_j}$(a, b, k) = 1}
Result: v, contains the similarity scores of shelves similar to shelf $s_i$
v ← associative array from shelf ID to similarity score
for (a, b, k) : $p_{s_i}$(a, b, k) = 1 do
    for j ∈ h(a, b, k) do
        v[j] ← v[j] + $\omega_k$
    end
end

---

Method 1 can also be used to find similar users given a, query user, when stored shelf data is replaced with stored user data. That is, one of the cataloged shelves or users is input as the query shelf or user, and Method 1 returns identifiers or one or more shelves or users deemed similar to the query shelf or user.

In various embodiments, a particular structure, described next, is maintained in order to facilitate efficient computation of book-to-book nearest neighbors. A hash map may be maintained that is indexed by a pair (a, k) representing a book a and neighborhood size k. Each entry maps to a list of books that have appeared within a neighborhood of size k of book a in at least one shelf in a given dataset:

$$h(a,k)=\{b: p_{all}(a,b,k)>0\}$$

The following method may be used to find the books that are nearest neighbors of book a query book, a.

---
Method 2: SimilarBooks(a)

---
Data: hashmap h(a, k) → {b : $p_{all}$(a, b, k) > 0}
Result: v, contains the similarity scores books similar to book a
v ← associative array from book ID to similarity score
for k = 1 ... K do
    for b ∈ h(a, k) do
        v[b] ← v[b] + $P_{all}$(a, b, k) · $\delta_k$

| Method 2: SimilarBooks(a) |
|---|
|     end<br>end |

While considered to be relatively efficient, the above method may be difficult to compute in real time for each query. Therefore, in various embodiments, these neighbor relationships are computed offline and updated according to a predetermined schedule.

Figure 4:
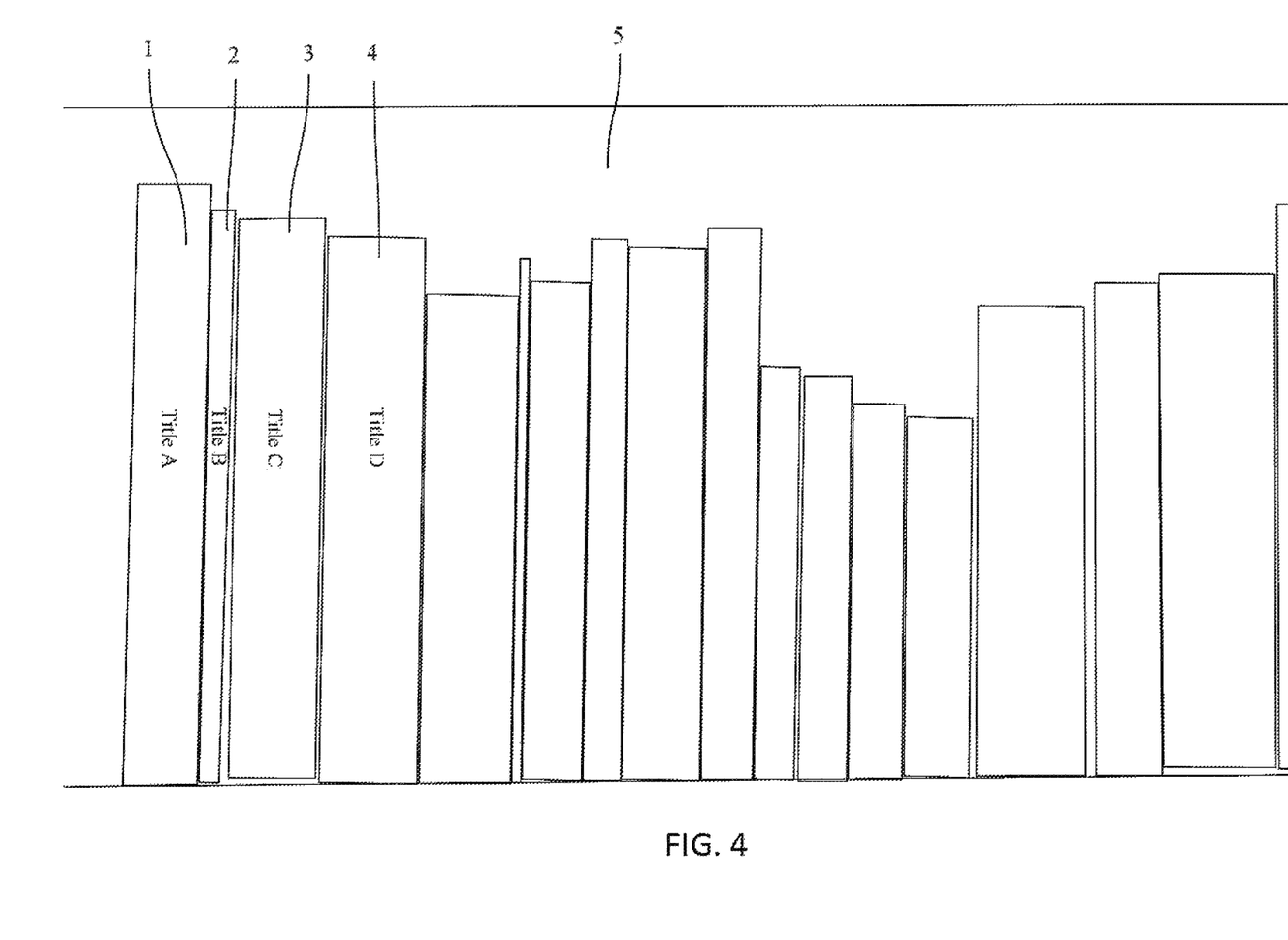
FIG. 4 illustrates a layout of an example bookshelf, according to an embodiment of the present disclosure.

FIG. 4 illustrates a layout of an example shelf 5. The shelf 5 includes at least four book items grouped together. Item 1 is "Title A". Item 2 is "Title B". Item 3 is "Title C". Item 4 is "Title D".

Figure 5:
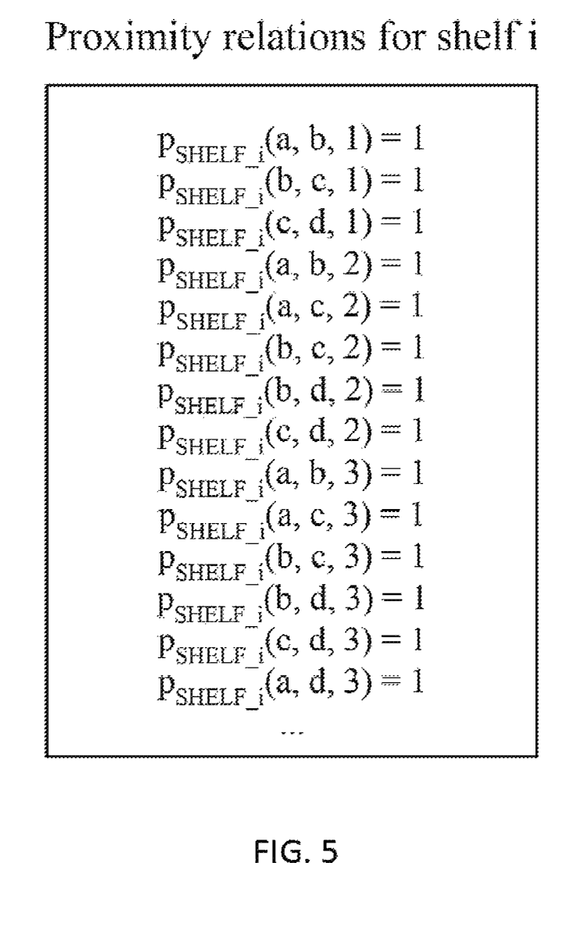
FIG. 5 illustrates proximity relations for the bookshelf of FIG. 4, according to an embodiment of the present disclosure.

FIG. 5 illustrates a portion of the proximity relations from the shelf in FIG. 1, assuming that K=3. FIG. 5 shows proximity relations between items 1-4 from FIG. 4 which have a value of one. Proximity relations which have a value of zero are not shown. The variables "a", "b", "c" and "d" correspond to "Title A," "Title B," "Title C" and "Title D," respectively. Thus, for example, because "Title B" is adjacent to both "Title A" and "Title C", $p_{SHELF_i}(a, b, k)$ and $p_{SHELF_i}(b, c, k)$ are equal to one for all k≥1. Similarly, because "Title C" is one book removed from "Title A," $p_{SHELF_i}(a, c, k)$ is equal to one for all k≥2.

Figure 6:
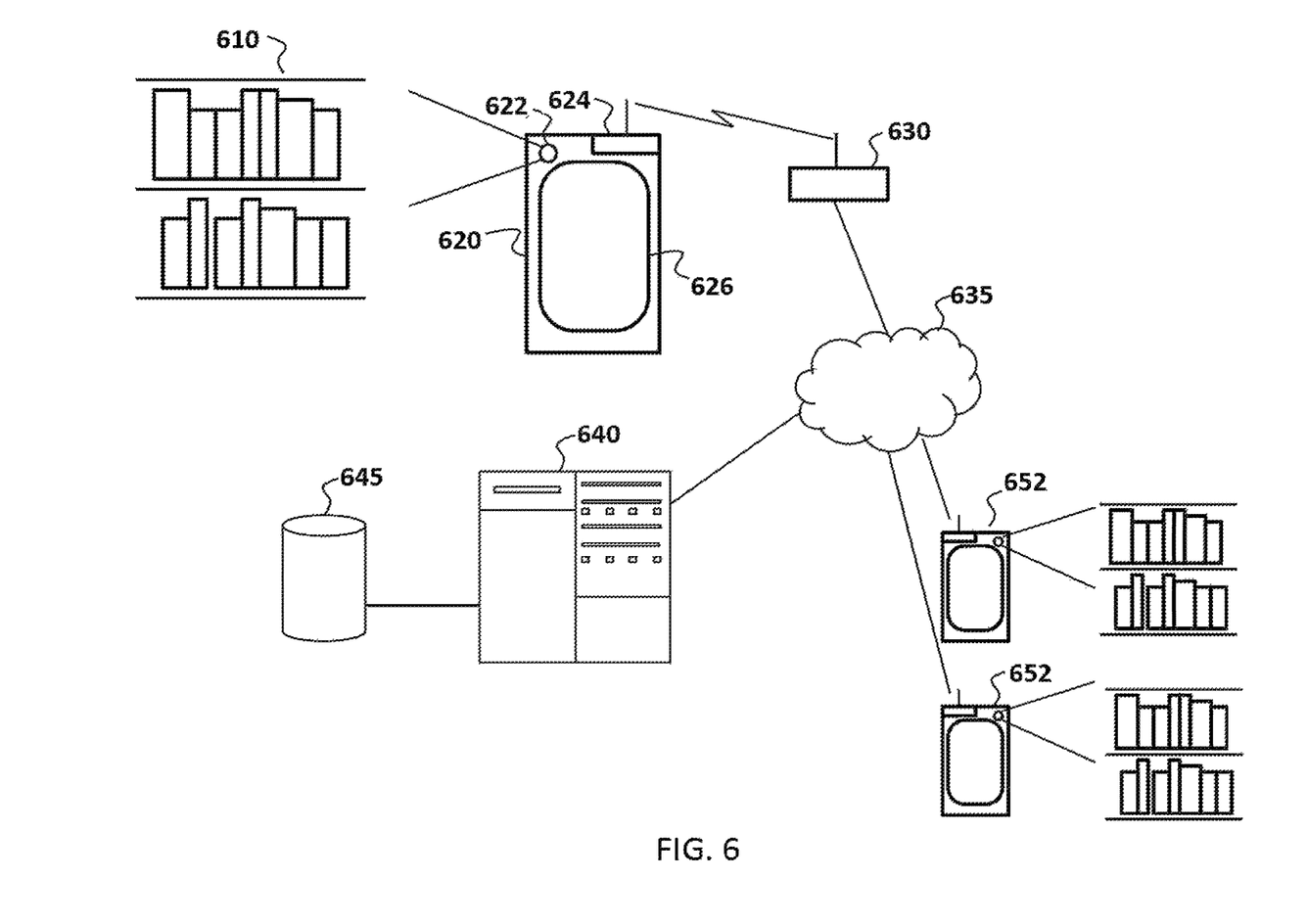
FIG. 6 illustrates a system provided in accordance with another embodiment of the present disclosure.

FIG. 6 illustrates a system provided in accordance with an embodiment of the present disclosure. The system includes a smartphone 620 communicatively coupled to a server 640. The smartphone may be replaced with another computing device such as a digital camera, laptop or desktop computer, tablet, game system, or the like. The smartphone includes a camera 622, a radio transceiver 624 and a user interface 626. The smartphone is communicatively coupled to the server via a wireless communication link to an access node 630 and a network 635 connecting the access node to the server. The server 640 includes or is coupled to a database 645.

Having regard to FIG. 6, a user is instructed to capture a photograph of a bookshelf 610 using the camera 622. The instructions and image capture operation may be mediated by an application running on the smartphone and interacting with the user via the user interface. The photograph is transmitted to the server 640 via the wireless communication link and network. Other smartphones 652 may similarly be used to capture and transmit photographs of other bookshelves to the server. The server is configured to process the photographs, extract information from the photographs, and store extracted information in the database. The server is further configured to retrieve data from the database and provide information to users, for example by transmitting an instruction to the smartphone to display the information on the user interface 626, or to provide raw or partially processed data to the smartphone for use in generating information to display on the user interface. The server includes a communication interface, such as a network interface, and processing circuitry such as a processor operatively coupled to memory. The smartphone is connected to the server via the communication interface, for example via an intermediate network such as the Internet. The server is configured to execute program instructions for carrying out operations for implementing the disclosure as described herein. The server includes processing circuitry such as a processor and one or more memories for this purpose, the memories holding program instructions for execution and also for storing pre-processed and/or post-processed data. The smartphone 620 also includes processing circuitry such as a microprocessor operatively coupled to memory and is configured to execute program instructions for carrying out operations for implementing the disclosure as described herein.

In some embodiments, the image capture device (e.g. smartphone) includes processing circuitry such as a computer processor operatively coupled to memory. In this case, if enough processing power is available, the image capture device can optionally be used to perform some of the computation otherwise being handled by the server. For example, image processing and/or proximity measurements can potentially be made partially or fully by the image capture device. However, it is recognized that it may be preferable to have the server perform all computationally intensive and memory intensive processing operations, such as image processing and proximity measurement computations.

Figure 7:
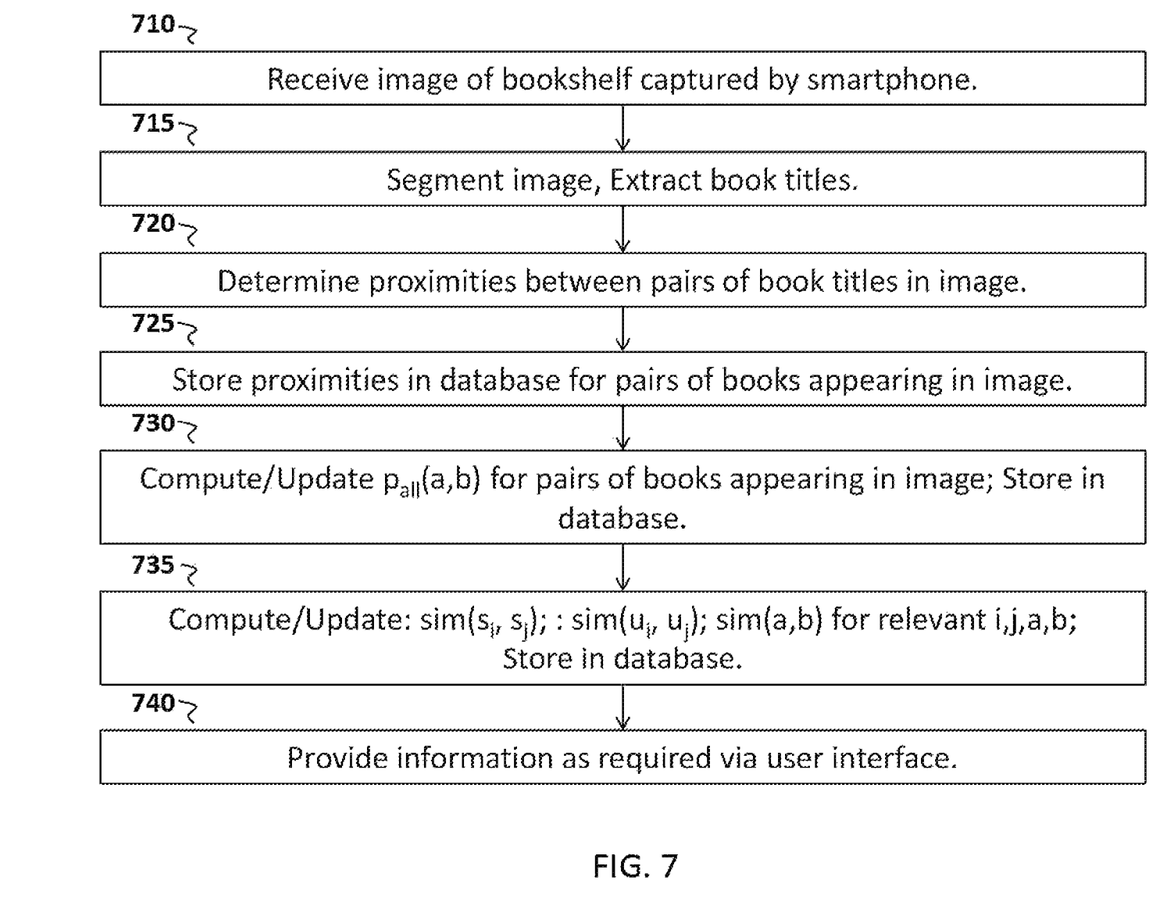
FIG. 7 illustrates a method including image processing, provided in accordance with another embodiment of the present disclosure.

FIG. 7 illustrates a method provided in accordance with an embodiment of the present disclosure. The method includes instructing a user to capture an image of a bookshelf using a smartphone, and receiving 710 the image of the bookshelf at the server. The method further includes segmenting 715 the image to identify objects therein such as books and titles of the books, and extracting information regarding the book titles. Image segmentation and title extraction may be performed at the server using image processing techniques as would be readily understood by a worker skilled in the art.

The method further includes determining 720 proximities between pairs of book titles appearing in the image. Each book title identified in the image can be associated with a location, such as (x, y) coordinates corresponding to a region or center-point in the image. The location can be identified as a location of the book object in the image from which the book title is extracted. Proximities between pairs of book titles can be determined and/or represented in a variety of ways. Proximity comprises a representation of distance between a given pair of books. In one embodiment, proximity between book titles a and b can be represented as a vector or one-dimensional array p(a, b) with $k^{th}$ entry p(a, b, k), where p(a, b, k) is a proximity relationship as defined above for the current bookshelf, namely p(a, b, k)=1 when the distance between books a and b on the current bookshelf is less than k and p(a, b, k)=0 otherwise.

Distances between pairs of books may be determined in a variety of ways. In particular embodiments as described herein, distances between books may be determined as an increasing function of a count of books (or other recognized objects) between the two books. For example, the distance between books a and b, where a and b are on the same shelf may be set to the number of objects k separating the two books. Alternatively, distances may be determined as Euclidean (straight-line) distances between book locations. Distances between books on the same shelf may be determined as horizontal Euclidean distances. Distances between books on separate shelves of a bookshelf may be determined as an increasing function of a count of shelves between the two shelves, and additionally as an increasing function of horizontal separation between the two books. Proximity can be considered to be a decreasing function of distance (and vice-versa), for example proximity may be inversely proportional to distance.

The method further includes storing 725 the determined proximities in a database for at least some and potentially all pairs of books appearing in the image. That is, for each pair of books a and b appearing in the image, p(a, b) or a representation thereof may be stored in the database. In various embodiments, there is no need to store both p(a, b) and p(b, a).

The method further includes computing and/or updating 730 $p_{all}(a, b)$ for each pair of books a and b appearing in the image. Here, $p_{all}(a, b)$ is a vector with $k^{th}$ entry $p_{all}(a, b, k)$. The values $p_{all}(a, b)$ are then stored in the database. Updating can be performed for example using a recursive calculation $p_{all}(a, b) = p_{all}(a, b) + p_u(a, b)$, where u is the user related to the current image.

The method further includes computing and/or updating 735 similarity metrics such as $sim(s_i, s_j)$, $sim(u_i, u_j)$ and $sim(a, b)$ related to the bookshelf, user, and book titles associated with the captured image. The computed and/or updated similarity metrics are stored in the database.

The method further comprises providing 740 information as required via the smartphone user interface. Providing the information may comprise transmitting raw or processed information from the database to the smartphone, either in advance of or upon receiving a request from the smartphone for information.

In one embodiment, information provided to the smartphone may indicate one or more books that are determined to be similar, based on the similarity metric sim(a, b), to one or more books indicated by the user. For example, when a user enters a book title a via the smartphone user interface or captures an image of a bookshelf containing book title a, a list of books not currently owned by the user which have the relatively highest similarity scores may be provided and displayed on the smartphone user interface. The list of similar books may be presented as a recommendation to the user of books to read and/or purchase.

In one embodiment, information provided to the smartphone may indicate one or more bookshelves that are determined to be similar, based on the similarity metric $sim(s_i, s_j)$, to one or more bookshelves owned by the user. For example, a user may request to browse bookshelves which are similar to their own, whereupon annotated images of bookshelves which are determined to be adequately similar to the users bookshelf are displayed on the smartphone user interface.

In one embodiment, information provided to the smartphone may indicate one or more users that are determined to be similar to the user, based on the similarity metric $sim(u_i, u_j)$. For example, a user may request to browse profiles of users who are similar to themselves, whereupon profiles of users who are determined to be adequately similar to the user are displayed on the smartphone user interface.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope.

What is claimed is:

1. An apparatus comprising:
   circuitry configured to
      acquire a captured image of a storage system via a network from a remote image capture device;
      identify a pair of physical items in the image, including determining identities of each item of the pair of physical items, and identifying locations in the storage system of each physical item of the pair of physical items;
      process the image to measure a physical proximity between the pair of physical items, the physical proximity between the pair of physical items being based on a distance between each item of the pair of physical items, the distance between a first physical item and a second physical item of the pair of physical items being based on a number of physical items separating the first physical item and the second physical item; and
      generate or update a measure of similarity between the pair of physical items based on the measured physical proximity.

2. The apparatus of claim 1, further configured to:
   receive, from the remote image capture device or another remote image capture device, one or more further images of one or more further respective storage systems;
   identify other instances of the pair of physical items in each of the further images, including determining said identities of each physical item of the pair of physical items, and identifying locations, in each of the further storage systems, of each physical item of the instance of the pair of physical items;
   process each of the further images to measure respective further physical proximities between the instance of the pair of physical items as occurring in each of the further storage systems; and
   update the measure of similarity between the pair of physical items based on the determined further physical proximities.

3. The apparatus of claim 1, wherein the physical items are books, the storage system is a bookshelf, and the identities comprise book titles.

4. The apparatus of claim 3, further configured to recommend, via a user interface of the remote image capture device or another device, books to a user based on the measure of similarity.

5. The apparatus of claim 4, wherein the user has indicated interest in one of the pair of books, and wherein recommending books to the user comprises recommending other of the pair of books to the user with a probability or recommendation strength which increases with the measure of similarity between the pair of books.

6. The apparatus of claim 1, wherein the measure of similarity is a nondecreasing function of a number of observed images of storage systems in which instances of the pair of physical items are identified, and is further a nondecreasing function of the measured physical proximity of instances of the pair of physical items in each of said observed images of storage systems in which instances of the pair of physical items are identified.

7. The apparatus of claim 1, wherein the measure of similarity is a weighted sum, and wherein generating or updating the measure of similarity comprises initializing or updating the weighted sum by adding a term thereto, the term having a numerical value which increases with the measured physical proximity, wherein the weighted sum is reflective of past and current observations of storage systems holding the pair of physical items.

8. The apparatus of claim 1, further comprising or operatively coupled to a database, the apparatus further configured to store, in the database, one or both of the measure of similarity and the measure of proximity, and provide, based on data stored in the database, information indicative of one or more of: similarities between physical items, similarities between storage systems, and similarities between persons associated with storage systems.

9. An apparatus for measuring similarities between storage systems or persons associated therewith, the storage systems containing collections of physical items, the apparatus comprising circuitry configured to:
direct capturing of images of two storage systems using one or more remote image capture devices;
receive the images of the two storage systems;
for each one of the images:
identify one or more pairs of physical items in the image, including determining identities of each physical item of each of the pairs of physical items, and identifying locations in the storage system of each physical item of each of the pairs of physical items;
process the image to measure physical proximities between physical items of each of the pairs of physical items, the physical proximity between the pair of physical items being based on a distance between each item of the pair of physical items, the distance between a first physical item and a second physical item of the pair of physical items being based on a number of physical items separating the first physical item and the second physical item; and
generate or update a measure of similarity between the storage systems or persons associated therewith, based on the physical proximities.

10. The apparatus of claim 9, further comprising or operatively coupled to a database and configured to:
store, in the database: indications of a plurality of the storage systems or persons associated therewith; and measures of similarities between pairs of the plurality of storage systems or persons associated therewith; and
upon receiving an indication of a first one of the plurality of storage systems or persons associated therewith, provide an indication of another of the plurality of storage systems or persons associated therewith having a relatively high measured similarity to said first one of the plurality of storage systems or persons associated therewith.

11. The apparatus of claim 9, wherein the measure of similarity is a nondecreasing function of a number of instances of pairs of physical items which occur in both of the two storage systems, and is further a nondecreasing function of similarity between the measured physical proximities between said instances of pairs of physical items which occur in both of the two storage systems.

12. The apparatus of claim 9, wherein the physical items are books, the storage systems are bookshelves, and the identities comprise book titles.

13. The apparatus of claim 9, wherein the measure of similarity is generated by computing a weighted sum over all of said one or more pairs of items appearing in the images of both of the two storage systems, each term in the weighted sum having a numerical value which is nondecreasing with measured physical proximity between a corresponding one of said pairs of items.

14. A method for automatically measuring similarities between physical items comprising:
acquiring an image of a storage system via a network from a remote image capture device;
identifying, using processing circuitry, a pair of physical items in the image, including determining identities of each item of the pair of physical items, and identifying locations in the storage system of each physical item of the pair of physical items;
processing, using the processing circuitry, the image to measure a physical proximity between the pair of physical items, the physical proximity between the pair of physical items being based on a distance between each item of the pair of physical items, the distance between a first physical item and a second physical item of the pair of physical items being based on a number of physical items separating the first physical item and the second physical item; and
generating or updating, using the processing circuitry, a measure of similarity between the pair of physical items based on the measured physical proximity.

15. The method of claim 14, further comprising:
receiving one or more further images of one or more further respective storage systems;
identifying other instances of the pair of physical items in each of the further images, including determining said identities of each physical item of the pair of physical items, and identifying locations, in each of the further storage systems, of each physical item of the instance of the pair of physical items;
processing each of the further images to measure respective further physical proximities between the instance of the pair of physical items as occurring in each of the further storage systems; and
updating the measure of similarity between the pair of physical items based on the determined further physical proximities.

16. The method of claim 14, wherein the physical items are books, the storage system is a bookshelf, and the identities comprise book titles.

17. The method of claim 16, further comprising recommending books to a user based on the measure of similarity.

18. The method of claim 17, wherein the user has indicated interest in one of the pair of books, and wherein recommending books to the user comprises recommending other of the pair of books to the user with a probability or recommendation strength which increases with the measure of similarity between the pair of books.

19. The method of claim 14, wherein the measure of similarity is a nondecreasing function of a number of observed images of storage systems in which instances of the pair of physical items are identified, and is further a nondecreasing function of the measured physical proximity of instances of the pair of physical items in each of said observed images of storage systems in which instances of the pair of physical items are identified.

20. The method of claim 14, further comprising storing, in a database, one or both of the measure of similarity and the measure of proximity, and providing, based on data stored in the database, information indicative of one or more of: similarities between physical items, similarities between storage systems, and similarities between persons associated with storage systems.

21. A method for measuring similarities between storage systems or persons associated therewith, the storage systems containing collections of physical items, the method comprising:

acquiring images of two storage systems via a network from one or more remote image capture devices;

for each one of the images:

identifying, using processing circuitry, one or more pairs of physical items in the image, including determining identities of each physical item of each of the pairs of physical items, and identifying locations in the storage system of each physical item of each of the pairs of physical items;

processing the image, using the processing circuitry, to measure physical proximities between physical items of each of the pairs of physical items, the physical proximity between the pair of physical items being based on a distance between each item of the pair of physical items, the distance between a first physical item and a second physical item of the pair of physical items being based on a number of physical items separating the first physical item and the second physical item; and generating or updating, using the processing circuitry, a measure of similarity between the storage systems or persons associated therewith, based on the physical proximities.

22. The method of claim 21, further comprising:

storing, in a database: indications of a plurality of storage systems or persons associated therewith; and measures of similarities between pairs of the plurality of storage systems or persons associated therewith; and upon receiving an indication of a first one of the plurality of storage systems or persons associated therewith, providing an indication of another of the plurality of storage systems or persons associated therewith having a relatively high measured similarity to said first one of the plurality of storage systems or persons associated therewith.

23. The method of claim 21, wherein the physical items are books, the storage systems are bookshelves, and the identities comprise book titles.

\* \* \* \* \*

UNITED STATES PATENT AND TRADEMARK OFFICE
CERTIFICATE OF CORRECTION

PATENT NO. : 10,318,843 B2  
APPLICATION NO. : 15/474128  
DATED : June 11, 2019  
INVENTOR(S) : Sancho Juan Carlos Dean Rob Roy McCann et al.

Page 1 of 1

It is certified that error appears in the above-identified patent and that said Letters Patent is hereby corrected as shown below:

In the Specification

Column 2, Line 33, delete "via, a" and insert -- via a --, therefor.

Column 10, Line 35, delete "(1 ... K)" and insert -- {1 ... K} --, therefor.

Column 12, Line 27-28 approx., delete "$h(a,b,k)=\{i: \mathbb{S}(a,b,k)=1\}$" and insert -- $h(a,b,k) = \{i : p_{s_i} \in \mathbb{S}(a,b,k) = 1\}$ --, therefor.

Column 12, Line 42-43 approx., delete "a, query user," and insert -- a query user, --, therefor.

Signed and Sealed this  
Twenty-fourth Day of December, 2019

Andrei Iancu  
*Director of the United States Patent and Trademark Office*